US010261186B2

(12) United States Patent
Ohnishi

(10) Patent No.: US 10,261,186 B2
(45) Date of Patent: Apr. 16, 2019

(54) THREE-DIMENSIONAL SURVEYING INSTRUMENT AND THREE-DIMENSIONAL SURVEYING METHOD

(71) Applicant: TOPCON Corporation, Tokyo-to (JP)

(72) Inventor: Kohji Ohnishi, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 338 days.

(21) Appl. No.: 15/163,731

(22) Filed: May 25, 2016

(65) Prior Publication Data

US 2016/0356888 A1 Dec. 8, 2016

(30) Foreign Application Priority Data

Jun. 4, 2015 (JP) .................................. 2015-114219

(51) Int. Cl.
*G01S 17/10* (2006.01)
*G01C 15/00* (2006.01)
(Continued)

(52) U.S. Cl.
CPC ............ *G01S 17/10* (2013.01); *G01C 15/002* (2013.01); *G01S 7/4868* (2013.01); *G01S 17/023* (2013.01);
(Continued)

(58) Field of Classification Search
CPC ....... G01C 15/002; G01C 15/06; G01S 17/42; G01S 17/66; G01S 17/74; G01S 7/48;
(Continued)

(56) References Cited

U.S. PATENT DOCUMENTS

2003/0137646 A1* 7/2003 Hoffman .................. G01C 3/08
356/4.01
2010/0315618 A1 12/2010 Hertzman
(Continued)

FOREIGN PATENT DOCUMENTS

| EP | 2787368 A1 | 10/2014 |
| JP | 2014-85134 A | 5/2014 |
| WO | 2015/077614 A1 | 5/2015 |

OTHER PUBLICATIONS

European communication dated Nov. 3, 2016 in corresponding European patent application No. 16172251.7.

*Primary Examiner* — Luke D Ratcliffe
(74) *Attorney, Agent, or Firm* — Nields, Lemack & Frame, LLC

(57) ABSTRACT

The invention provides a three-dimensional surveying instrument, which comprises a light emitter for emitting a pulsed distance measuring light, a scanning unit for scanning a range as required including an object to be measured with the distance measuring light from the light emitter, a distance measuring unit for performing a distance measurement based on a reflected light from the object to be measured, at least one image pickup unit for acquiring an image of the object to be measured, a filter unit provided on an image pickup optical axis of the image pickup unit and a control arithmetic unit which enables changing a measurement mode, wherein the filter unit has at least a distance measuring light transmission filter for transmitting the distance measuring light, and the control arithmetic unit calculates a reflectance information of the object to be measured based on a distance measuring light image acquired by the image pickup unit through the distance measuring light transmission filter.

11 Claims, 5 Drawing Sheets

(51) Int. Cl.
- *G01S 17/42* (2006.01)
- *G01S 17/89* (2006.01)
- *G01S 7/486* (2006.01)
- *G01S 17/02* (2006.01)
- *G01C 3/08* (2006.01)

(52) U.S. Cl.
CPC .............. *G01S 17/42* (2013.01); *G01S 17/89* (2013.01); *G01C 3/08* (2013.01)

(58) Field of Classification Search
CPC ....... G01S 7/4818; G01S 7/497; G01B 5/004; G01B 11/002; G02B 5/132; G02B 5/122
See application file for complete search history.

(56) References Cited

U.S. PATENT DOCUMENTS

| | | | |
|---|---|---|---|
| 2013/0155386 A1* | 6/2013 | Bridges | G01C 15/002 356/4.01 |
| 2014/0111618 A1 | 4/2014 | Kumagai et al. | |
| 2014/0307252 A1* | 10/2014 | Hinderling | G01C 15/006 356/141.4 |

* cited by examiner

THREE-DIMENSIONAL SURVEYING INSTRUMENT AND THREE-DIMENSIONAL SURVEYING METHOD

BACKGROUND OF THE INVENTION

The present invention relates to a three-dimensional surveying instrument having an image pickup unit which can perform photographing with a plurality of wavelengths and to a three-dimensional surveying method.

Conventionally, as a surveying instrument, to acquire many pieces of three-dimensional data (three-dimensional point cloud data) of an object to be measured in a short time, a three-dimensional laser scanner has been known.

In the three-dimensional laser scanner, a scanning unit, which deflects a pulse-emitted distance measuring light in a measurement direction, is rotated, a measurement range including an object to be measured is scanned with the distance measuring light, and by receiving the reflected light, the three-dimensional data of the object to be measured is acquired.

However, the reflectance information of the object to be measured with respect to the distance measuring light is usually unknown, and a result, when the object to be measured is scanned with the distance measuring light, cannot be predicted. In the conventional three-dimensional laser scanner, it is necessary to actually scan the distance measuring light with respect to the object to be measured, perform measuring, output a measurement result to a display device of a PC or the like, also it is necessary for an operator to judge based on a outputted result whether or not a desired data has successfully acquired. Further, if the desired data has not been acquired, it is necessary to change a measurement condition, and scan again the object to be measured with the distance measuring light, and hence it takes time to complete the measurement according to the circumstances.

SUMMARY OF THE INVENTION

It is an object of the present invention to provide a three-dimensional surveying instrument and a three-dimensional surveying method capable of acquiring a reflectance information of an object to be measured before executing a measurement.

To attain the object as described above, a three-dimensional surveying instrument according to the present invention comprises a light emitter for emitting a pulsed distance measuring light, a scanning unit for scanning a range as required including an object to be measured with the distance measuring light from the light emitter, a distance measuring unit for performing a distance measurement based on a reflected light from the object to be measured, at least one image pickup unit for acquiring an image of the object to be measured, a filter unit provided on an image pickup optical axis of the image pickup unit and a control arithmetic unit which enables changing a measurement mode, wherein the filter unit has at least a distance measuring light transmission filter for transmitting the distance measuring light, and the control arithmetic unit calculates a reflectance information of the object to be measured based on a distance measuring light image acquired by the image pickup unit through the distance measuring light transmission filter.

Further, in the three-dimensional surveying instrument according to the present invention, the filter unit further has a visible light transmission filter which transmits the visible light, and the control arithmetic unit compares a visible light image acquired by the image pickup unit through the visible light, transmission filter with the distance measuring light image and calculates the reflectance information of the object to be measured.

Further, in the three-dimensional surveying instrument according to the present invention, the distance measuring light is an infrared light in an invisible range, and the control arithmetic unit calculates the reflectance information of the object to be measured based on a comparison between the distance measuring light image of the infrared light alone acquired through the distance measuring transmission filter and the visible light image.

Further, in the three-dimensional surveying instrument according to the present invention, the distance measuring light is the visible light in a predetermined band of a visible range, and the control arithmetic unit calculates the reflectance information of the object to be measured based on a comparison between the distance measuring light image of the visible light in the predetermined band alone acquired through the distance measuring light transmission filter and the visible light image.

Further, in the three-dimensional surveying instrument according to the present invention, the light emitter is configured to use the distance measuring light which is the infrared light as a photographing light and the distance measuring light transmission filter is an infrared light transmission filter, and wherein the control arithmetic unit makes the image pickup unit to receive the reflected light from the object to be measured through the distance measuring transmission filter, acquires the distance measuring light image and calculates the reflectance information of the object to be measured based on the distance measuring light image.

Further, in the three-dimensional surveying instrument according to the present invention, the control arithmetic unit selects a measurement mode based on the reflectance information of the object to be measured.

Further, the three-dimensional surveying instrument according to the present invention comprises a zoom mechanism, wherein a beam diameter of the distance measuring light is changeable by the zoom mechanism.

Furthermore, in a three-dimensional surveying method according to the present invention for measuring a three-dimensional information of an object to be measured, as a preliminary step for performing a measurement of the object to be measured, the method comprises; acquiring a distance measuring light image through a distance measuring light transmission filter which transmits the distance measuring light, calculating a reflectance information of the object to be measured based on the distance measuring light image and selecting a measurement mode which enables measuring the object to be measured based on the reflectance information.

According to the present invention, a three-dimensional surveying instrument comprises a light emitter for emitting a pulsed distance measuring light, a scanning unit for scanning a range as required including an object to be measured with the distance measuring light from the light emitter, a distance measuring unit for performing a distance measurement based on a reflected light from the object to be measured, at least one image pickup unit for acquiring an image of the object to be measured, a filter unit provided on an image pickup optical axis of the image pickup unit and a control arithmetic unit which enables changing a measurement mode, wherein the filter unit has at least a distance measuring light transmission filter for transmitting the distance measuring light, and the control arithmetic unit calculates a reflectance information of the object to be measured based on a distance measuring light image acquired by the image pickup unit through the distance measuring light transmission filter. As a result, it is possible to judge whether or not a desired three-dimensional data can be acquired before measuring, and a working efficiency at a measurement site can be improved.

Further, according to the present invention, in the three-dimensional surveying instrument, the filter unit further has a visible light transmission filter which transmits the visible light, and the control arithmetic unit compares a visible light image acquired by the image pickup unit through the visible light transmission filter with the distance measuring light image and calculates the reflectance information of the object to be measured. As a result, it is possible to judge whether or not the desired three-dimensional data can be acquired before measuring, and the working efficiency at a measurement site can be improved.

Further, according to the present invention, in the three-dimensional surveying instrument, the distance measuring light is an infrared light in an invisible range, and the control arithmetic unit calculates the reflectance information of the object to be measured based on a comparison between the distance measuring light image of the infrared light, alone acquired through the distance measuring transmission filter and the visible light image. As a result, the reflectance information of the object to be measured can be acquired in advance, and the working efficiency can be improved.

Further, according to the present invention, in the three-dimensional surveying instrument, the distance measuring light is the visible light in a predetermined band of a visible range, and the control arithmetic unit calculates the reflectance information of the object to be measured based on a comparison between the distance measuring light image of the visible light in the predetermined band alone acquired through the distance measuring light transmission filter and the visible light image. As a result, a reflected light amount from the object to be measured can be increased, the clear distance measuring light image can be acquired, and a calculation accuracy of the reflectance information can be improved.

Further, according to the present invention, in the three-dimensional surveying instrument, the light emitter is configured to use the distance measuring light which is the infrared light as a photographing light and the distance measuring light transmission filter is an infrared light transmission filter, and wherein the control arithmetic unit makes the image pickup unit to receive the reflected light from the object to be measured through the distance measuring transmission filter, acquires the distance measuring light image and calculates the reflectance information of the object to be measured based on the distance measuring light image. As a result, a reflected light amount from the object to be measured can be increased, a calculation accuracy of the reflectance information can be improved, and also the distance measuring light image can be acquired even in a dark space.

Further, according to the present invention, in the three-dimensional surveying instrument, the control arithmetic unit selects a measurement mode based on the reflectance information of the object to be measured. As a result, it is not necessary to perform remeasurement due to a failure in acquisition of the desired three-dimensional data of the object to be measured, and a working time can be reduced.

Further, according to the present invention, the three-dimensional surveying instrument comprises a zoom mechanism, wherein a beam diameter of the distance measuring light is changeable by the zoom mechanism. As a result, the light amount of the reflected light can be adjusted based on the reflectance information of the object to be measured.

Furthermore, according to the present invention, in a three-dimensional surveying method for measuring a three-dimensional information of an object to be measured, as a preliminary step for performing a measurement of the object to be measured, the method comprises; acquiring a distance measuring light image through a distance measuring light transmission filter which transmits the distance measuring light, calculating a reflectance information of the object to be measured based on the distance measuring light image and selecting a measurement mode which enables measuring the object to be measured based on the reflectance information. As a result, it is possible to judge whether or not the desired three-dimensional data can be acquired before measuring, and the working efficiency at a measurement site can be improved.

DETAILED DESCRIPTION OF THE PREFERRED EMBODIMENTS

A description will be given below on an embodiment of the present invention by referring to the attached drawings.

First, referring to FIG. 1, a description will be given on an example of a three-dimensional laser scanner which is a three-dimensional surveying instrument according to a first embodiment of the present invention.

Figure 1:
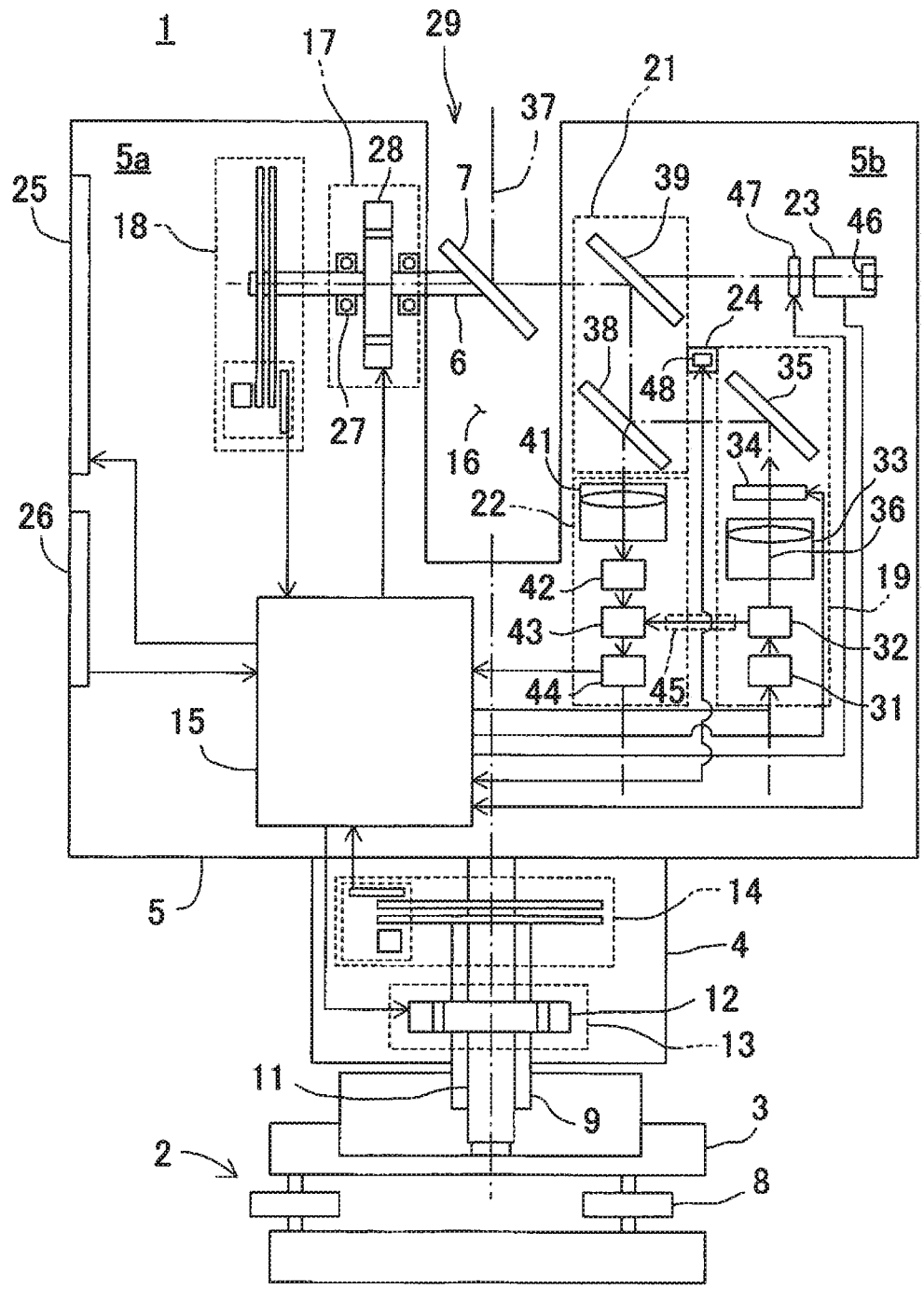
FIG. 1 is a schematic sectional elevational view of a three-dimensional laser scanner which is an example of a three-dimensional surveying instrument according to an embodiment of the present invention.

As shown in FIG. 1, a three-dimensional laser scanner 1 comprises a leveling unit 2 mounted on a tripod (not shown), a base unit 3 provided on the leveling unit 2, a frame unit 5 provided on the base unit 3 via a horizontal rotary unit 4 so as to be rotatable in a horizontal direction, and a scanning mirror 7 provided on the frame unit 5 so as to be rotatable around a vertical rotation shaft 6 as the center in a vertical direction (an elevational direction).

The leveling unit 2 has, e.g., three adjusting screws R. When the adjusting screw 8 is adjusted so that a tilt sensor (not shown) provided on the frame unit 5 detects a horizontality, a leveling of the leveling unit 2 is performed.

The horizontal rotary unit 4 has a horizontal rotation shaft 11 which is rotatably and vertically supported on the base unit 3 via a bearing 9. The frame unit 5 is supported by the horizontal rotation shaft 11, and the frame unit 5 is configured to rotate together with the horizontal rotation shaft 11.

The horizontal rotary unit 4 accommodates a horizontal driving unit 13 which includes a horizontal drive motor 12, and a horizontal angle detector (e.g., an encoder) 14 which detects a rotation angle of the horizontal rotation shaft 11. The frame unit 5 is rotated around the horizontal rotation shaft 11 as the center by the horizontal drive motor 12. It is so designed that a rotation angle of the horizontal rotation shaft 11 with respect to the base unit 3, i.e., a rotation angle of the frame unit 5 is detected by the horizontal angle detector 14.

Further, a detection result (a horizontal angle) of the horizontal angle detector 14 is input to a control arithmetic unit 15 (to be described later), and a driving of the horizontal drive motor 12 is controlled by the control arithmetic unit 15 based on the detection result.

A recessed portion 16 is formed in a central portion of the frame unit 5, and rooms 5a and 5b are formed so that the rooms 5a and 5b horizontally sandwich the recessed portion 16 therebetween. One room 5a (a left room in the drawing) accommodates a vertical driving unit 17 and a vertical angle detector 18. Further, the other room 5b (a right room in the drawing) accommodates a distance measuring light emitting unit 19, a common optical path unit 21, a distance measuring unit 22, a first image pickup unit 23, a second image pickup unit 24, or the like. Further, the control arithmetic unit 15 or the like is accommodated at a necessary position of an inside of the frame unit 5, and a display unit 25 and an operation unit 26 are provided on necessary parts of the frame unit 5.

The vertical rotation shaft 6 has an axis which extends horizontally, and is rotatably supported on the frame unit 5 via a bearing 27. One end portion of the vertical rotation shaft 6 protrudes into the recessed portion 16, and the scanning mirror 7 is provided at a protrusion end of the vertical rotation shaft 6 in such a manner that the scanning mirror 7 tilts 45° with respect to the axis of the vertical rotation shaft 6. The scanning mirror 7 is supported in the recessed portion 16 by the vertical rotation shaft 6, and is able to freely rotate around the vertical rotation shaft 6 in the vertical direction.

The vertical driving unit 17 has a vertical drive motor 28, and the vertical rotation shaft 6 is adapted to be rotated by the vertical drive motor 28. The scanning mirror 7 is rotated by the vertical drive motor 28 via the vertical rotation shaft 6. It is to be noted that the vertical rotation shaft 6, the scanning mirror 7, the vertical drive motor 28, or the like make up together a scanning unit 29.

The vertical angle detector 18, e.g., an incremental encoder is provided to the vertical rotation shaft 6. A rotation angle of the vertical rotation shaft 6 with respect to the frame unit 5 is detected by the vertical angle detector 18. A detection result (a vertical angle) of the vertical angle detector 18 is input to the control arithmetic unit 15, and the driving of the vertical drive motor 28 is controlled by the control arithmetic unit 15 based on the detection result.

The distance measuring light emitting unit 19 has a distance measuring light emitter 31, an optical path splitting member 32 such as a half mirror or a beam splitter or the like, a light projecting optical unit 33 constituted of an objective lens or the like, a zoom mechanism 34, and a mirror 35. The distance measuring light emitter 31 is, e.g., a semiconductor laser or the like, and emits a pulsed laser beam of an infrared light which is an invisible light on a distance measuring optical axis 37 as the distance measuring light 36. Further, the distance measuring light emitter 31 is controlled by the control arithmetic unit 15 so that a pulse light is emitted in a state as required, e.g., a light intensity as required, a pulse interval (a frequency) as required, or the like. Further, the zoom mechanism 34 is constituted of a condenser lens or the like, and can change a beam diameter (a spread angle) of the distance measuring light 36.

The common optical path unit 21 has a first beam splitter 38 and a second beam splitter 39. Further, the distance measuring unit 22 has a light receiving optical unit 41 constituted of a condenser lens or the like, an optical path extension part 42, an optical path coupler 43, and a photodetection element 44.

A part of the distance measuring light 36 emitted from the distance measuring light emitter 31 passes through the optical path splitting member 32 and enters the mirror 35 through the light projecting optical unit 33 and the zoom mechanism 34. The distance measuring light 36 is reflected by the mirror 35 and led to the common optical path unit 21. Further, a remaining part of the distance measuring light 36 is reflected by the optical path splitting member 32 as an internal reference light, and led to an internal reference optical path 45.

The distance measuring light 36 reflected by the mirror 35 is sequentially reflected by the first beam splitter 38 and the second beam splitter 39. The distance measuring light 36 is led to the scanning mirror 7 after being reflected by the second beam splitter 39. It is to be noted that the distance measuring light 36 passed through the first beam splitter 38 and the second beam splitter 39 is absorbed by an antireflective member (not shown).

The scanning mirror 7 is a deflecting optical member, and the mirror 7 reflects the distance measuring light 36 which is incident from the horizontal direction at a right angle and reflects a reflected distance measuring light, which enters the scanning mirror 7 toward the second beam splitter 39 in the horizontal direction.

The distance measuring light 36, which is led to the scanning mirror 7 from the common optical path unit 21, is reflected by the scanning mirror 7, and irradiated to an object to be measured (not shown). Further, when the scanning mirror 7 is rotated around the vertical rotation shaft 6, the distance measuring light 36 is projected in rotary irradiation within a vertical plane. Further, when the horizontal rotary unit 4 rotates the frame unit 5 in the horizontal direction, the distance measuring light 36 is projected in rotary irradiation around the horizontal rotation shaft 11 in the horizontal direction. Therefore, due to a cooperation of the rotation of the scanning mirror 7 in the vertical direction and the rotation of the frame unit 5 in the horizontal direction, an entire measurement range can be scanned by the distance measuring light 36.

The reflected distance measuring light as reflected at the object to be measured which exists within the measurement range enters the scanning mirror 7, is reflected by the scanning mirror 7 and enters the common optical path unit 21. The reflected distance measuring light is reflected by the second beam splitter 39, further passes through the first beam splitter 38 and is led to the distance measuring unit 22.

The distance measuring unit 22 leads the reflected distance measuring light passed through the first beam splitter 38 to the photodetection element 44. Further, the distance measuring unit 22 is configured to lead the internal reference light led by the internal reference optical path 45 to the photodetection element 41 via the optical path coupler 43.

The reflected distance measuring light passed through the first beam splitter 38 enters the light receiving optical unit 41, is condensed by the light receiving optical unit 41 and enters the optical path extension part 42. The reflected distance measuring light as passed through the optical path extension part 42 is received by the photodetection element 44 via the optical path coupler 43. Further, the internal reference light as passed through the internal reference optical path 45 is received by the photodetection element 44 via the optical path coupler 43.

In the photodetection element 44, the reflected distance measuring light and the internal reference light are converted into a reflected distance measuring light electric signal and an internal reference light electric signal respectively, and transmitted to the control arithmetic unit 15. It is so arranged that based on a time difference between the reflected distance measuring light electric signal and the internal reference light electric signal, the control arithmetic unit 15 determines a distance to the object to be measured.

The control arithmetic unit 15 calculates a three-dimensional coordinate value of the object to be measured based on the distance as measured to the object to be measured, a vertical angle detected by the vertical angle detector 18, and a horizontal angle detected by the horizontal angle detector 14. Further, by recording a coordinate value of the object to be measured for each pulse, the control arithmetic unit 15 can acquire the three-dimensional point cloud data with respect to the entire measurement range or with respect to the object to be measured. The horizontal angle detector 14 and the vertical angle detector 18 make up together an angle detector which detects a direction of the distance measuring optical axis 37.

The first image pickup unit 23 is a narrow-angle camera having a field angle of, e.g., 10°. The first image pickup unit 23 has an image pickup element 46 provided on an image pickup optical axis, and the image pickup element 46 is configured to output a digital image signal. The image pickup element 46 is constituted of an aggregate of pixels, e.g., a CCD or CMOS sensor or the like, and a position of each pixel in the image pickup element 46 can be identified.

Further, a first filter unit 47 is provided on the image pickup optical axis of the first image pickup unit 23. The first filter unit 47 has a visible light transmission filter (not shown) which allows only the visible light to pass through and a distance measuring light transmission filter (not shown) such as an IR filter (an infrared light transmission filter) or the like which allows only the distance measuring light 36 to pass through, and it is so arranged that the visible light transmission filter and the distance measuring light transmission filter can be changed. By the fact that the first filter unit 47 switches the visible light transmission filter and the distance measuring light transmission filter, it is possible to select a wavelength of the light which enters the first image pickup unit 23.

The second image pickup unit 24 is a wide-angle camera having a field angle of, e.g., 60°, and is provided on, e.g., a front side of the frame unit 5. Similar to the first image pickup unit 23, a second filter unit 48 is provided on an image pickup optical axis of the second image pickup unit 24. The second filter unit 48 has a visible light transmission filter (not shown) which allows only the visible light to pass through and a distance measuring light transmission filter (not shown) which allows only the distance measuring light 36 to pass through, and it is so arranged that the visible light transmission filter and the distance measuring light transmission filter can be switched. By the fact that the second filter unit 48 switches the visible light transmission filter and the distance measuring light transmission filter, it is possible to select a wavelength of the light which enters the second image pickup unit 24.

Figure 2:
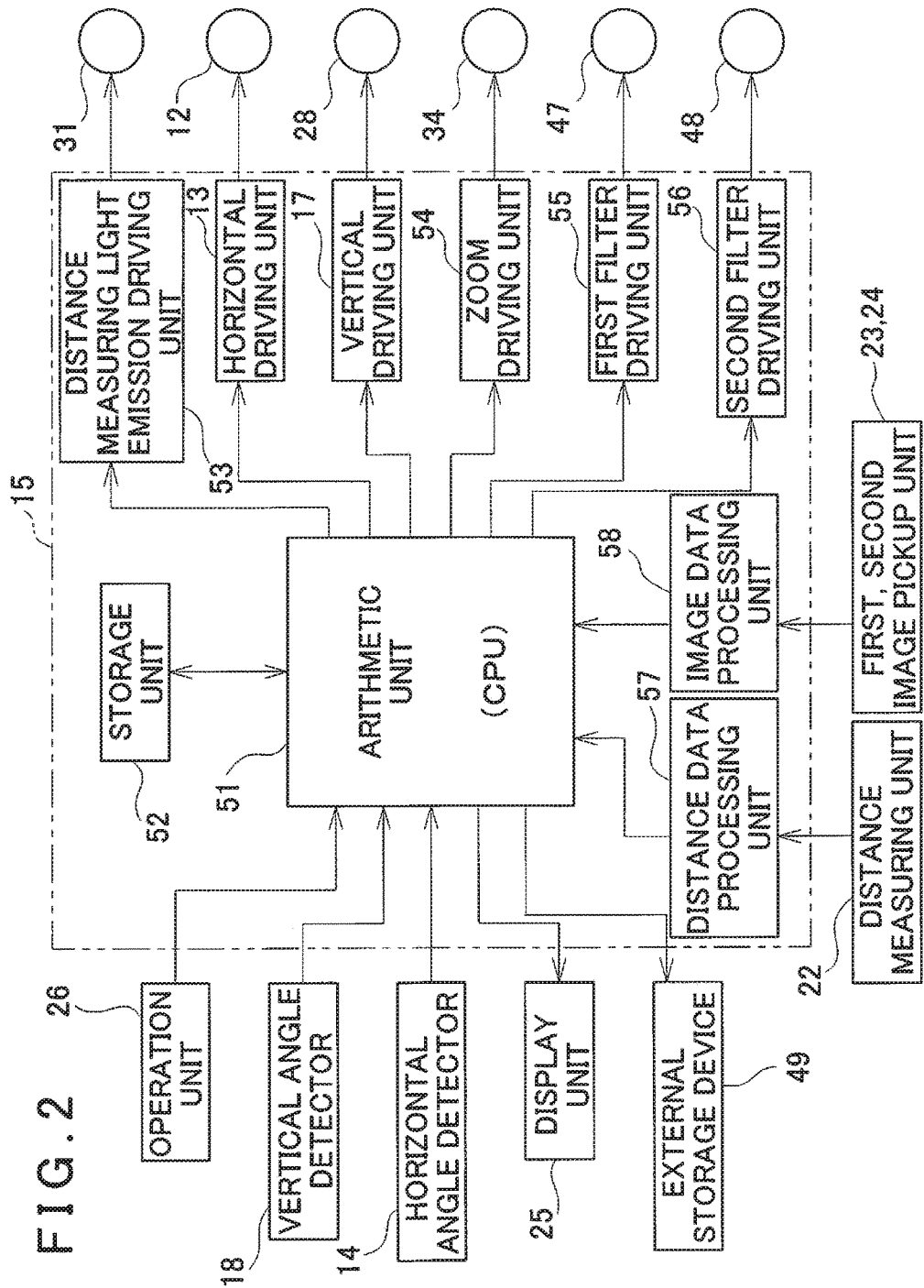
FIG. 2 is a block diagram to show an arrangement of the three-dimensional laser scanner.

Next, by referring to FIG. 2, a description will be given on a control system of the three-dimensional laser scanner 1.

To the control arithmetic unit 15, the operation unit 26, the vertical angle detector 18, the horizontal angle detector 14, the zoom mechanism 34, the first filter unit 47 and the second filter unit 48 are electrically connected. Angle detection signals from the vertical angle detector 18 and the horizontal angle detector 14 are input to the control arithmetic unit 15, and by an operation of an operator, a signal from the operation unit 26 is also input to the control arithmetic unit 15.

The operator performs setting conditions required to start the measurement of the three-dimensional laser scanner 1 from the operation unit 26, e.g., setting a measurement range, setting a point cloud data density (a pitch), setting a measurement modes as described later, or setting an image pickup condition at the time of photographing. It is to be noted that the operation unit 26 and the display unit 25 may be provided on the frame unit 5, or may be connected to the three-dimensional laser scanner 1 via a cable. Further, the operation unit 26 and the display unit 25 may be additionally independently provided, and may be remotely operatable via a signal transmission medium such as a radio wave or an infrared light.

The control arithmetic unit 15 drives the distance measuring light emitter 31, the horizontal drive motor 12, the vertical drive motor 28, the zoom mechanism 34, the first filter unit 47 and the second filter unit 48, and also drives the display unit 25 for displaying an operating condition, a measurement result, or the like. Further, an external storage device 49 such as a memory card or an HDD is provided to the control arithmetic unit 15. The external storage device 49 may be fixedly provided or detachably provided to the control arithmetic unit 15.

Next, a description will be given on general features of the control arithmetic unit 15.

The control arithmetic unit 15 has an arithmetic unit 51 as represented by a CPU, a storage unit 52, a distance measuring light emission driving unit 53 for controlling a light emission of the distance measuring light emitter 31, the horizontal driving unit 13 for driving and controlling the horizontal drive motor 12, the vertical driving unit 17 for driving and controlling the vertical drive motor 28, a zoom driving unit 54 for driving and controlling the zoom mechanism 34, a first filter driving unit 55 for driving and controlling the first filter unit 47 and a second filter driving unit 56 for driving and controlling the second filter unit 48.

Further, the control arithmetic unit 15 has a distance data processing unit 57 for processing a distance data acquired by the distance measuring unit 22, an image data processing unit 58 for processing an image data acquired by the first image pickup unit 23 and the second image pickup unit 24, or the like.

The storage unit 52 stores a sequence program configured to perform the distance measurement, the measurement of a vertical angle, and the measurement of a horizontal angle, an arithmetic program configured to perform a calculation such as a calculation of the distance measurement or the like, a measurement data processing program configured to execute the processing of a measurement data, an image pickup program configured to control image pickup states of the first image pickup unit 23 and the second image pickup unit 24, an image processing program configured to execute an image processing, a reflectance arithmetic program configured to perform a calculation of the reflectance information of an object to be measured, a measurement mode notifying program configured to notify an optimum measurement mode based on the reflectance information as detected, and a program configured to integrally manage these programs, or the like.

Further, the storage unit 52 stores the data, e.g., the measurement data and the image data or the like, and also stores a plurality of measurement modes. The respective measurement modes are the combinations of measurement mode setting factors, which are a light intensity of the distance measuring light 36 emitted from the distance measuring light emitter 31, a light emission frequency, a beam diameter of the distance measuring light 36 changed by the zoom mechanism 34, or the like, in the form of respective values different from each other.

It is to be noted that the functions of the distance data processing unit 57 and the image data processing units 58 may be executed by the arithmetic unit 51. In this case, the distance data processing unit 57 and the image data processing unit 58 can be omitted.

Further, the distance data processing unit 57 and the image data processing unit 58 may be separately provided. For instance, a PC may be separately provided, and the PC may be configured to execute the functions of the distance data processing unit 57 and the image data processing unit 58. In this case, the three-dimensional laser scanner 1 and the PC may be provided with the communication means, the distance data and the image data are transmitted to the PC and the PC may execute the distance data processing and the image data processing. As the communication means, the communication means as required, e.g., an optical communication, a wireless communication, an LAN, or the like can be adopted.

In a case where an object to be measured is measured by the three-dimensional laser scanner 1, especially in a case where the distance measuring light 36 is irradiated and the point cloud data is acquired, the reflected distance measuring light with a sufficient light amount is required. In a case where the light amount of the reflected distance measuring light is not enough and a desired point cloud data cannot be acquired, it is necessary to change a measurement mode, i.e., the light intensity or a beam diameter of the distance measuring light 36 or the like, and to perform measuring again. Thus, it is desirable to know a reflectance information (an acquisition rate information of a point cloud) of the object to be measured in advance.

In the present embodiment, as a preliminary step of measuring an object to be measured, a reflectance arithmetic processing to acquire the reflectance information of the object to be measured is executed.

Figure 3:
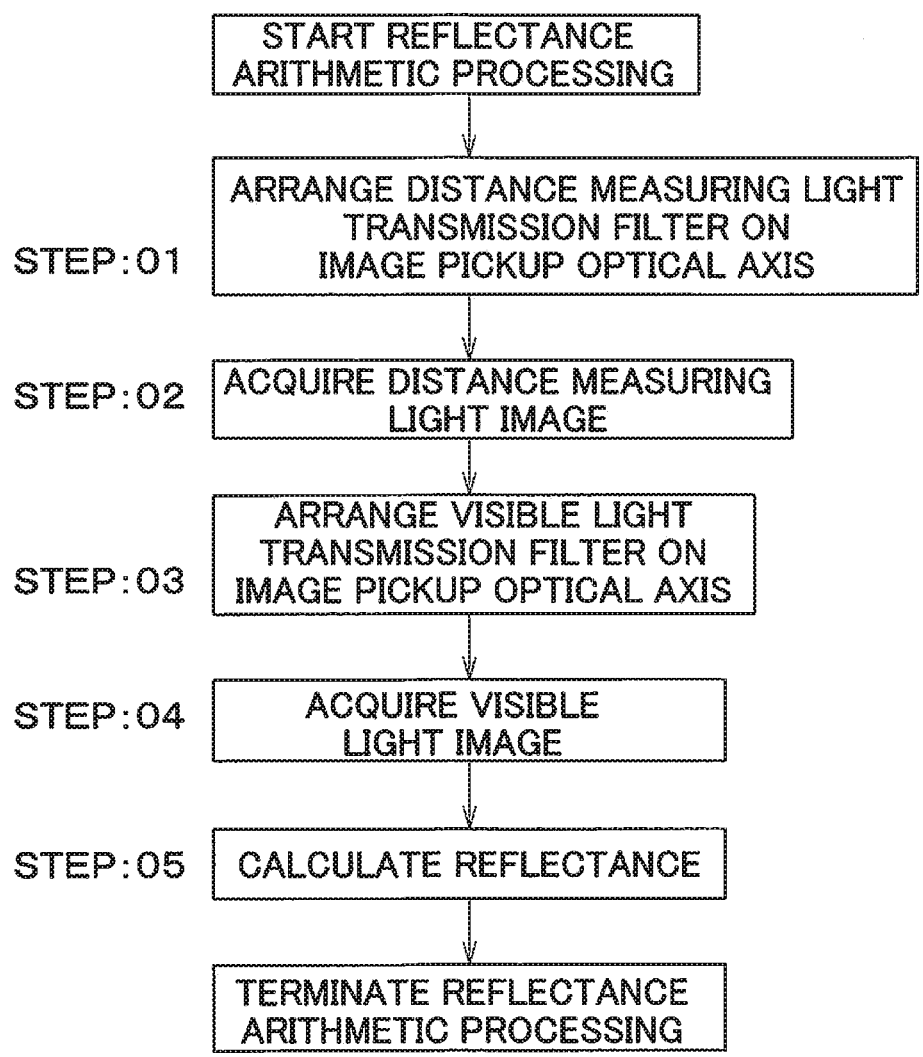
FIG. 3 is a flowchart to explain a reflectance arithmetic processing according to the embodiment of the present invention.
Figure 4:
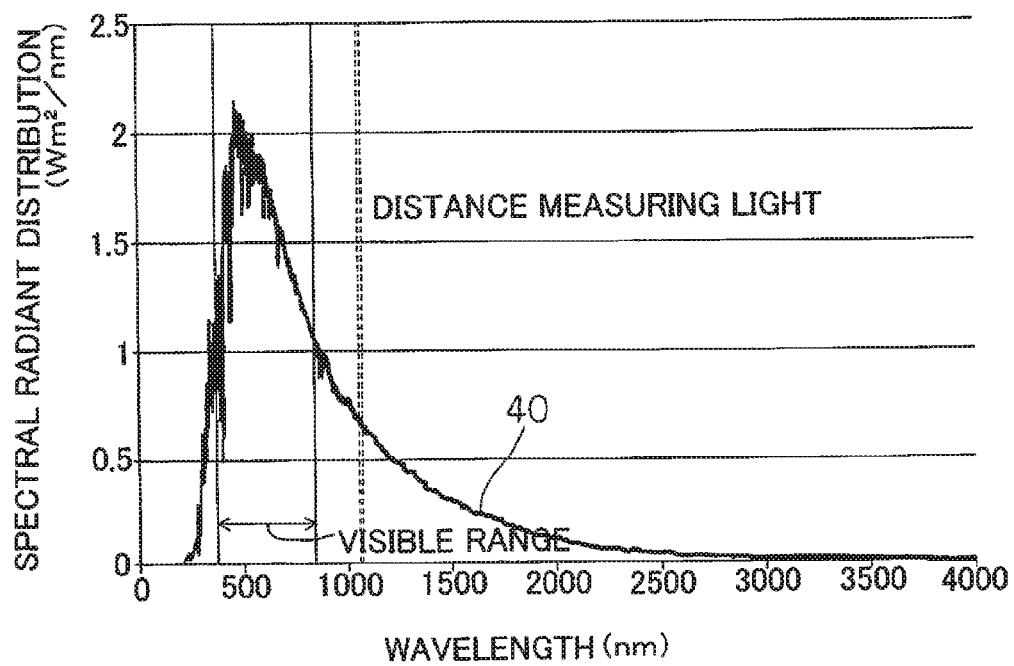
FIG. 4 is a graph to show a spectral radiant distribution of sunlight.

By referring to a flowchart of FIG. 3, a description will be given on a case where the reflectance arithmetic processing is executed outside under a sunlight by using the first image pickup unit 23 and the first filter unit 47. FIG. 4 shows a spectral radiant distribution 40 of the sunlight. As shown in FIG. 4, a greater part of the sunlight is the visible light. That is to say, a proportion of a wavelength of the distance measuring light 36 in the sunlight is low, and a visible range and an invisible light range have different sunlight radiant energies.

Figure 5:
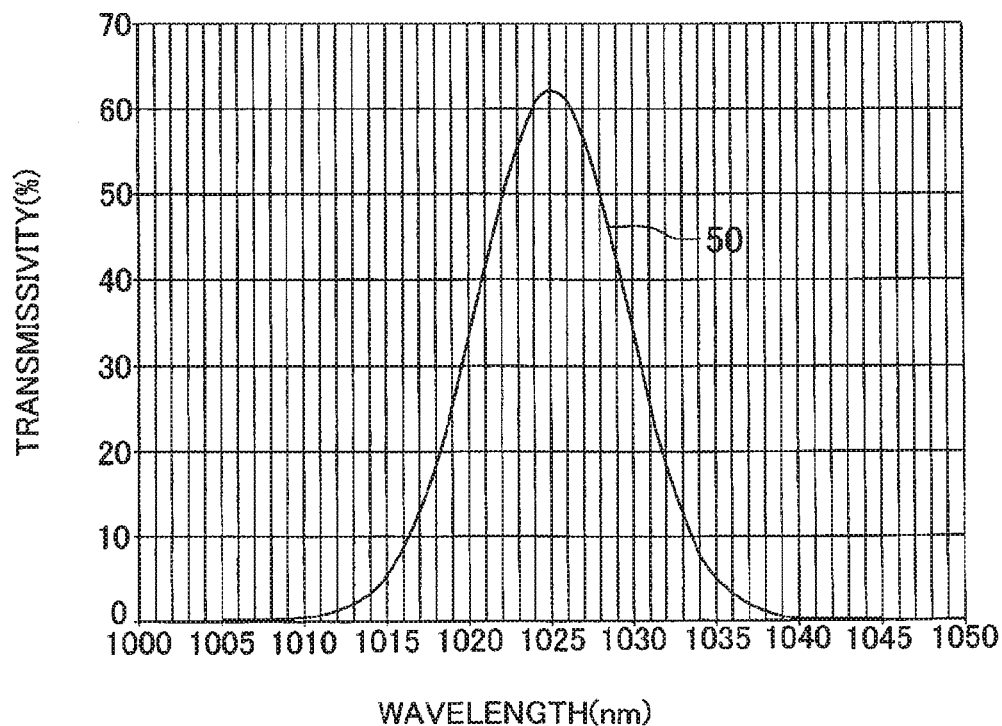
FIG. 5 is a graph to show an example of a transmission wavelength of a distance measuring light transmission filter according to the embodiment of the present invention.

The first filter unit 47 has a visible light transmission filter and a distance measuring light transmission filter. The distance measuring light transmission filter in the present embodiment is a filter which transmits a light of tens nm range with a wavelength of the distance measuring light 36 as the center. For instance, in a case where the distance measuring light 36 has a wavelength of 1024 nm, as the distance measuring light transmission filter, as shown in FIG. 5, a filter which allows a wavelength range 50 of bounds from approximately 1005 nm to 1045 nm to pass through is used.

STEP: 01 At a reflectance arithmetic processing step, first, the first filter driving unit 55 drives the first filter unit 47, and the distance measuring light transmission filter is arranged on the image pickup optical axis of the first image pickup unit 23. In this state, a wavelength in the invisible light of the sunlight close to the distance measuring light 36 is transmitted through the first filter unit 47.

STEP: 02 Next, the object to be measured as set is picked up by the first image pickup unit 23. Consequently, it is possible to pick up a distance measuring light image 59 (see FIG. 6) of the object to be measured corresponding to a reflectance of the distance measuring light 36 through the distance measuring light transmission filter.

Figure 6:
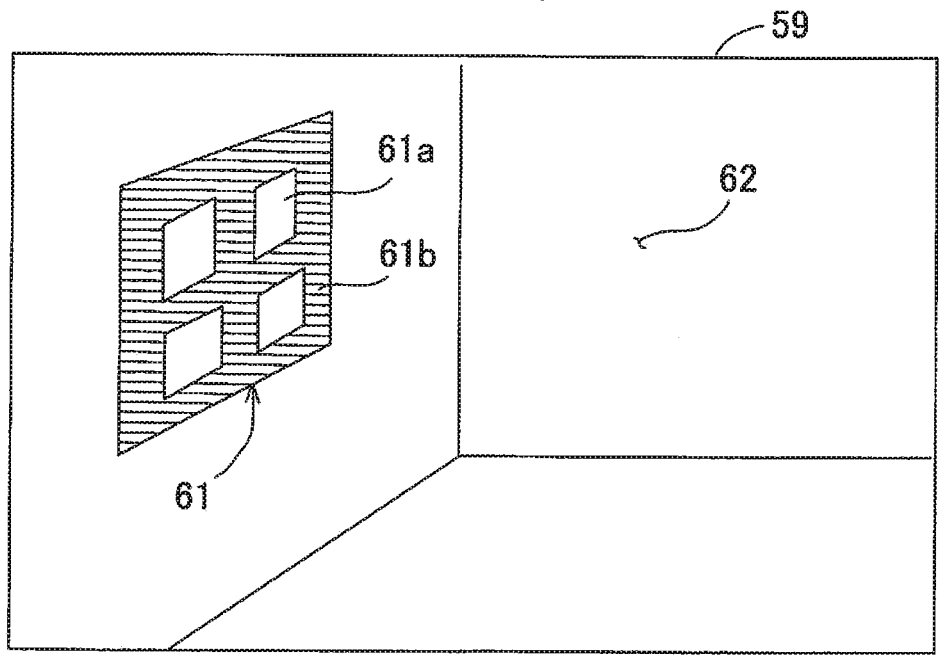
FIG. 6 is an explanatory drawing to show an example of a distance measuring light image according to the embodiment of the present invention.

FIG. 6 shows an example of the distance measuring light image 59 picked up through the distance measuring light transmission filter. As shown in FIG. 6, of a window unit 61 and a wall surface 62 displayed in the distance measuring light image 59, in a case where a window frame 61b is made of a material having a lower reflectance with respect to the distance measuring light 36 than a window 61a, the window frame 61b in the distance measuring light image 59 is displayed dark.

By acquiring the distance measuring light image 59 through the distance measuring light transmission filter, it is possible to predict that a reflectance of the window frame 61b, i.e., a point cloud acquisition rate is poorer than that of the wall surface 62.

STEP: 03 When the distance measuring light image 59 is acquired, next, the first filter driving unit 55 drives the first filter unit 47, and the visible light transmission filter is positioned on the image pickup optical axis of the first image pickup unit 23. In this state, the visible light in the sunlight is adapted to transmit the first filter unit 47.

STEP: 04 Then, when the object to be measured is picked up by the first image pickup unit 23, a normal visible light image of the object to be measured can be acquired through the visible light transmission filter.

STEP: 05 When the distance measuring light image 59 and the visible light image are picked up, then the image data processing unit 58 calculates a reflectance of the object to be measured based on a comparison between the distance measuring light image 59 and the visible light image.

Assuming that an average energy amount in the visible range (a sum of the radiant energies in the visible range/the number of wavelengths in the visible range) is V, an attenuation rate of the energy due to transmitting the visible light transmission filter is $\alpha$, and a fluctuation rate of the energy due to a color hue of the object to be measured is $\gamma$, an average energy amount Vs of the visible light which enters the image pickup element 46 in a case where the image is picked up through the visible light transmission filter can be represented by the following equation:

$$Vs = V \times \alpha \times \gamma$$

Further, assuming that an average energy amount in the invisible range for the distance measuring light 36 (the radiant energy of a wavelength of the distance measuring light 36) is I and an attenuation rate of the energy due to transmitting the distance measuring light transmission filter is $\beta$, an average energy amount (the radiant energy of the wavelength of the distance measuring light 36) Is, which enters the image pickup element 46 in the case of performing photographing through the distance measuring light transmission filter for the distance measuring light 36, can be represented by the following equation:

$$Is = I \times \beta$$

Further, a relationship between Is and Vs can be represented by the following equation:

$$Is = P \times Vs \text{ (P is a correction coefficient)}$$

With the above-described equations, the energy amount transmitted through the distance measuring light transmission filter is estimated based on the energy amount transmitted through the visible light transmission filter. That is, by multiplying a result of photographing using the distance measuring light transmission filter by the correction coefficient, the accurate reflectance information (the acquisition rate information of a point cloud) of the object to be measured is acquired, and the reflectance arithmetic processing is terminated.

When the reflectance arithmetic processing is terminated, an operator manually selects a measurement mode based on the acquired reflectance information of the object to be measured. Alternatively, the control arithmetic unit 15 selects a mode which is optimum for scanning the object to be measured based on the reflectance information, and notifies the operator via the display unit 25.

Figure 7A:
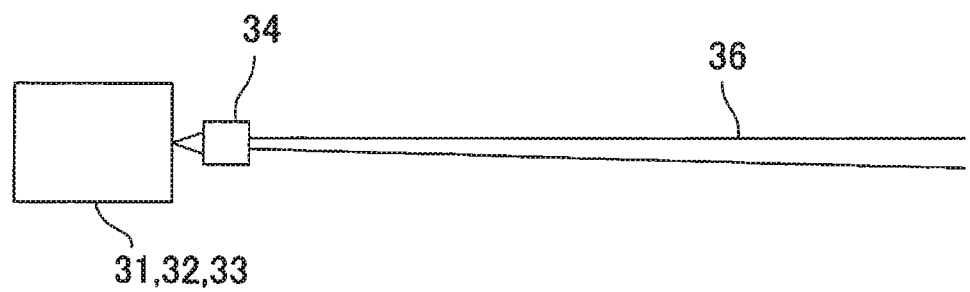
FIG. 7A is an explanatory drawing to show a case where a measurement mode is a short-distance data acquisition mode.
Figure 7B:
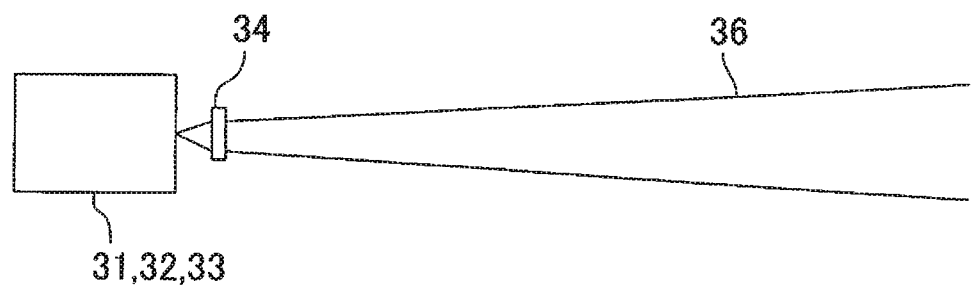
FIG. 7B is an explanatory drawing to show a case where the measurement mode is an all-distance adaptive mode.

For instance, in a state where the measurement mode of the three-dimensional laser scanner 1 is set to an all-distance adaptive mode (see FIG. 7B), the reflectance arithmetic processing is executed. In a case where such a distance measuring light image 59 as shown in FIG. 6 is acquired by the reflectance arithmetic processing, the operator is notified of a short-distance data acquisition mode (see FIG. 7A) in which a beam diameter of the distance measuring light 36 is reduced in order to increase the point cloud acquisition rate with respect to the window frame 61 with a lower reflectance.

When the operator selects the measurement mode in accordance with the notification and allows the three-dimensional laser scanner 1 to execute scanning the object to be measured, the reflected distance measuring light with the sufficient light amount can be received from the window frame 61 with the low reflectance. Therefore, the point cloud acquisition rate of the point cloud data of the object to be measured can be improved.

As described above, in the present embodiment, by executing the reflectance arithmetic processing before executing measurement of the object to be measured, it is possible to acquire the reflectance information (the acquisition rate information of a point cloud) of the object to be measured in advance. Therefore, it can be judged whether or not the desired point cloud data can be acquired before the measurement, and the working efficiency at a measurement site can be improved.

Further, the optimum measurement mode can be selected based on the reflectance information acquired in advance, and the desired point cloud data can be acquired even in a single measurement. Therefore, even if the reflectance of the object to be measured is low, since the desired point cloud data can be acquired, it is not necessary to change the measurement mode and perform remeasurement, and the working time can be reduced.

Next, a description will be given on a second embodiment according to the present invention by referring to FIG. 1. Although the infrared light which is the invisible light is used as the distance measuring light 36 in the first embodiment, a specific wavelength in the visible light is used as the distance measuring light 36 in the second embodiment.

In this case, a first filter unit 47 has a visible light transmission filter and a distance measuring light transmission filter such as a bandpass filter or the like which transmits the distance measuring light 36 alone or transmits the distance measuring light 36 and the light having a wavelength close to the distance measuring light 36.

In the second embodiment, similar to the first embodiment, a control arithmetic unit 15 compares the visible light image acquired by a first image pickup unit 23 through the visible light transmission filter with the distance measuring light image 59 acquired by the first image pickup unit 23 through the distance measuring light transmission filter, and based on the comparing result, the control arithmetic unit 15 can acquire the reflectance information of an object to be measured which is present in a measurement range and can inform an operator of an optimum measurement mode.

When a wavelength in the visible range having a large radiant energy amount is used as the distance measuring light 36, the reflected distance measuring light having the sufficient light amount can be acquired. Therefore, the distance measuring light image 59 can be acquired clearly, and the reflectance information can be calculated with high accuracy.

Next, a description will be given on a third embodiment according to the present invention by referring to FIG. 1. In the first embodiment and the second embodiment, photographing the object to be measured is performed by the first image pickup unit 23 outside under the sunlight based on the reflection of the sunlight but in the third embodiment, a distance measuring light 36 emitted from a distance measuring light emitter 31 is used as a photographing light.

In the third embodiment, a beam diameter of the distance measuring light 36 is increased by using a zoom mechanism 34 (see FIG. 7B), the distance measuring light 36 is irradiated to an object to be measured, and a reflected distance measuring light is entered into an image pickup element 46 through a distance measuring light transmission filter which allows only the distance measuring light 36 to pass through.

By using the distance measuring light 36 as a light source, the reflected distance measuring light is transmitted through the distance measuring light transmission filter as it is, and hence the clearer distance measuring light image 59 can be acquired. Therefore, a calculation accuracy of the reflectance information can be improved.

Further, since the distance measuring light 36 which is the infrared light is used as a light source, a three-dimensional laser scanner 1 can be used even in a dark space, and a convenience of the three-dimensional laser scanner 1 can be further improved.

It is to be noted that in the first embodiment to third embodiment, the reflectance arithmetic processing is executed by the first image pickup unit 23 which is a narrow-angle camera but the reflectance arithmetic processing can be likewise executed by the second image pickup unit 24 which is a wide-angle camera.

Further, in the first embodiment to the third embodiment, the first filter unit 47 is provided on the image pickup optical axis of the first image pickup unit 23 and the second filter unit 48 is provided on the image pickup optical axis of the second image pickup unit 24 but the first image pickup unit 23 and the second image pickup unit 24 may be constituted of two image pickup units, respectively, a visible light transmission filter provided on one of said two image pickup units and a distance measuring transmission filter provided on the other of said two image pickup units.

The invention claimed is:

1. A three-dimensional surveying instrument comprising; a light emitter for emitting a pulsed distance measuring light, a scanning unit for scanning a range as required including an object to be measured with said distance measuring light from said light emitter, a distance measuring unit for performing a distance measurement based on a reflected light from said object to be measured, at least one image pickup unit for acquiring an image of said object to be measured, a filter unit provided on an image pickup optical axis of said image pickup unit and a control arithmetic unit which enables changing a measurement mode, wherein said filter unit has at least a distance measuring light transmission filter for transmitting said distance measuring light, and said control arithmetic unit calculates a reflectance information of said object to be measured based on a distance measuring light image acquired by said image pickup unit through said distance measuring light transmission filter and selects a measurement mode based on said reflectance information of said object to be measured.

2. The three-dimensional surveying instrument according to claim 1, wherein said filter unit further has a visible light transmission filter which transmits the visible light, and said control arithmetic unit compares a visible light image acquired by said image pickup unit through said visible light transmission filter with said distance measuring light image and calculates the reflectance information of said object to be measured.

3. The three-dimensional surveying instrument according to claim 2, wherein said distance measuring light is an infrared light in an invisible range, and said control arithmetic unit calculates the reflectance information of said object to be measured based on a comparison between said distance measuring light image of the infrared light alone acquired through said distance measuring transmission filter and said visible light image.

4. The three-dimensional surveying instrument according to claim 2, wherein said distance measuring light is the visible light in a predetermined band of a visible range, and said control arithmetic unit calculates the reflectance information of said object to be measured based on a comparison between said distance measuring light image of said visible light in said predetermined band alone acquired through said distance measuring light transmission filter and said visible light image.

5. The three-dimensional surveying instrument according to claim 1, wherein said light emitter is configured to use said distance measuring light which is the infrared light as a photographing light and said distance measuring light transmission filter is an infrared light transmission filter, and wherein said control arithmetic unit makes said image pickup unit to receive the reflected light from said object to be measured through said distance measuring transmission filter, acquires said distance measuring light image and calculates the reflectance information of said object to be measured based on said distance measuring light image.

6. The three-dimensional surveying instrument according to claim 1, further comprising a zoom mechanism, wherein a beam diameter of said distance measuring light is changeable by said zoom mechanism.

7. A three-dimensional surveying method for measuring a three-dimensional information of an object to be measured, as a preliminary step for performing a measurement of said object to be measured, said method comprising; acquiring a distance measuring light image through a distance measuring light transmission filter which transmits the distance measuring light, calculating a reflectance information of said object to be measured based on said distance measuring light image and selecting a measurement mode which enables measuring said object to be measured based on said reflectance information.

8. The three-dimensional surveying instrument according to claim 2, further comprising a zoom mechanism, wherein a beam diameter of said distance measuring light is changeable by said zoom mechanism.

9. The three-dimensional surveying instrument according to claim 3, further comprising a zoom mechanism, wherein a beam diameter of said distance measuring light is changeable by said zoom mechanism.

10. The three-dimensional surveying instrument according to claim 4, further comprising a zoom mechanism, wherein a beam diameter of said distance measuring light is changeable by said zoom mechanism.

11. The three-dimensional surveying instrument according to claim 5, further comprising a zoom mechanism, wherein a beam diameter of said distance measuring light is changeable by said zoom mechanism.

* * * * *